US008140188B2

(12) United States Patent
Takemitsu et al.

(10) Patent No.: US 8,140,188 B2
(45) Date of Patent: Mar. 20, 2012

(54) ROBOTIC SYSTEM AND METHOD FOR OBSERVING, LEARNING, AND SUPPORTING HUMAN ACTIVITIES

(75) Inventors: Mori Takemitsu, Aichi (JP); Steven F. Kalik, Arlington, MA (US)

(73) Assignees: Toyota Motor Engineering & Manufacturing North America, Inc., Erlanger, KY (US); Toyota Motor Corporation, Toyota (JP)

( * ) Notice: Subject to any disclaimer, the term of this patent is extended or adjusted under 35 U.S.C. 154(b) by 1065 days.

(21) Appl. No.: 12/032,919

(22) Filed: Feb. 18, 2008

(65) Prior Publication Data
US 2009/0210090 A1  Aug. 20, 2009

(51) Int. Cl.
*G06F 17/00* (2006.01)
(52) U.S. Cl. ............ 700/245; 700/211; 700/247; 901/1; 901/47
(58) Field of Classification Search .............. 700/245, 700/211, 247; 901/47, 1; 99/326, 334
See application file for complete search history.

(56) References Cited

U.S. PATENT DOCUMENTS

| | | | | |
|---|---|---|---|---|
| 4,922,435 A | * | 5/1990 | Cahlander et al. ............ | 700/247 |
| 5,018,438 A | * | 5/1991 | Grandi ............................ | 99/335 |
| 5,125,328 A | * | 6/1992 | Grandi ............................ | 99/335 |
| 5,132,914 A | * | 7/1992 | Cahlander et al. ............ | 700/211 |
| 5,172,253 A | | 12/1992 | Lynne | |
| 5,172,328 A | * | 12/1992 | Cahlander et al. ............ | 700/211 |
| 5,386,762 A | * | 2/1995 | Gokey ............................ | 99/326 |
| 5,504,841 A | | 4/1996 | Tani | |
| 6,697,707 B2 | | 2/2004 | Peters, II | |
| 7,128,265 B2 | * | 10/2006 | Silverbrook et al. ..... | 235/462.08 |
| 7,131,372 B2 | * | 11/2006 | Lyons ............................ | 101/42 |
| 7,174,830 B1 | * | 2/2007 | Dong ............................ | 99/334 |
| 7,303,776 B2 | * | 12/2007 | Sus et al. ...................... | 426/413 |
| 7,637,437 B2 | * | 12/2009 | Lapstun et al. ............... | 235/494 |
| 7,703,636 B2 | * | 4/2010 | Sus et al. ............... | 221/150 HC |
| 2005/0001842 A1 | | 1/2005 | Park et al. | |

(Continued)

FOREIGN PATENT DOCUMENTS
JP  7019818  1/1995
(Continued)

OTHER PUBLICATIONS

Becher, R., I. Boesnach, P. Steinhaus, and R. Dillman. "From subjects to objects and back-combining human motions and object properties to understand user actions." (believed to have been offered for sale, publicly used, and/or published prior to the filing date of this application), Oct. 2006.

(Continued)

*Primary Examiner* — Thomas Black
*Assistant Examiner* — Wae Louie
(74) *Attorney, Agent, or Firm* — Gifford, Krass, Sprinkle, Anderson & Citkowski, P.C.

(57) ABSTRACT

An example method for allowing a robot to assist with a task, the task being carried out in an environment including one or more non-human objects each having associated object locations, comprises detecting one or more changes in object locations within the environment, predicting a task requirement (such as a future object location change, or task goal) by comparing the change in the object location with stored data, the stored data including object location changes associated with previously observed tasks; and providing robotic assistance to achieve the task requirement. Example apparatus are also disclosed.

18 Claims, 7 Drawing Sheets

U.S. PATENT DOCUMENTS

| | | | |
|---|---|---|---|
| 2005/0149227 A1 | 7/2005 | Peters | |
| 2005/0240412 A1* | 10/2005 | Fujita | 704/270 |
| 2005/0246063 A1* | 11/2005 | Oonaka | 700/245 |
| 2006/0020368 A1* | 1/2006 | Tanaka | 700/245 |
| 2006/0149428 A1 | 7/2006 | Kim et al. | |
| 2009/0210090 A1* | 8/2009 | Takemitsu et al. | 700/245 |

FOREIGN PATENT DOCUMENTS

| | | |
|---|---|---|
| JP | 2000006068 | 1/2000 |
| JP | 2004130427 | 4/2004 |
| JP | 2004147133 | 5/2004 |
| WO | WO-02081156 | 10/2002 |

OTHER PUBLICATIONS

Bennewitz, M., W. Burgard, G. Cielniak, S. Thrun. "Learning Motion Patterns of People for Compliant Robot Motion." (believed to have been offered for sale, publicly used, and/or published prior to the filing date of this application.), 2005.

Pei, J., J. Han, B. Mortazavi-Asl, H. Pinto, Q. Chen, U. Dayal, M. Hsu. "PrefixSpan: Mining Sequential Patterns Efficiently by Prefix-Projected Pattern Growth." (believed to have been offered for sale, publicly used, and/or published prior to the filing date of this application.), Apr. 2001.

Hoffman, G. and C. Breazeal. "Effects of Anticipatory Action on Human-Robot Teamwork: Efficiency, Fluency, and Perception of Team." (believed to have been offered for sale, publicly used, and/or published prior to the filing date of this application), 2010.

Fukuda, T., Y. Nakauchi, T. Matsubara. "Cooking Procedure Support System by Using Autonomous Mobile Robot and Touch Panel Display." (believed to have been offered for sale, publicly used, and/or published prior to the filing date of this application), Apr. 2011.

Yang, H., A. Park, S Lee. "Human-Robot Interaction by Whole Body Gesture Spotting and Recognition." The 18th International Conference on Pattern Recognition 2006.

Burke, J.L., R. R. Murphy, E. Rogers, V.J. Lumelsky, J. Scholtz. "Final Report for the DARPA/NSF Interdisciplinary Study on Human-Robot Interaction." IEEE Transactions on Systems, Man, and Cybernetics 2004, vol. 34.

Schmid, R.E. "Self-Reliant Robot." IndyStar.com Nov. 26, 2006.

* cited by examiner

ROBOTIC SYSTEM AND METHOD FOR OBSERVING, LEARNING, AND SUPPORTING HUMAN ACTIVITIES

FIELD OF THE INVENTION

The invention relates to robotics, in particular to improved methods and apparatus for supporting human activities.

BACKGROUND OF THE INVENTION

There are many circumstances in which an activity would benefit from robotic assistance. A robot could usefully assist a human in many tasks, such as household activities, industrial activities, and the like. However, using conventional approaches it is difficult for a robot to identify how it might help. One approach might be for the human to give detailed instructions, the robot responding dutifully to each instruction. However this puts a heavy burden on the human, and it would be better if the robot itself could take a more thoughtful approach to assisting the human. However, interpretation of human actions and gestures is a complex problem.

Action selection for a robot is discussed in G. Hoffman and C. Breazeal, "Cost-Based Anticipatory Action Selection for Human-Robot Fluency", IEEE Transactions on Robotics. Vol. 23, No. 5, 2007.

Robotic assistance would be considerably facilitated by new approaches in which a robot could attempt to predict task requirements.

SUMMARY OF THE INVENTION

The invention relates to a robotic system and methods for assisting an activity, in particular human activities. In representative examples of the present invention, a robot senses an environment including one or more (non-human) objects each having an object location, and detects changes to the object locations. An algorithm is used to match the observed location changes with stored data, so as to predict how the robot can assist with a current task. The stored data may include patterns of location changes, such as chronological sequences of location changes for various objects, associated with particular tasks. Hence, in examples of the present invention, a robot can identify a task in progress from location changes of objects within the environment, and does not need to interpret human activities beyond the effect of such activities on the objects in the environment. Such an approach may be much simpler computationally than attempting to interpret all aspects of human motion within the environment. Examples of the present approach allows greater flexibility in object locations, by learning sequences of location changes for a larger variety including potentially novel or unknown tasks, and by including additional algorithms to better interpret potential location change sequences and to store those sequences for comparison to previously observed sequences when predicting how to best support human task performance.

An example robot comprises sensors and supporting electronic circuitry operable to sense the environment of the robot and objects located within the environment. Changes in object location are detected, and compared with stored data, such as historical location change data. An object location change may be compared to previously determined object location change patterns, to predict the next location change of the object, and/or location change of other objects. The nature of a task in progress may also be determined from a detected object location change, and this task identification used to predict further activities. A robot may initially be preprogrammed with rules, or may learn from an environment in which it is located. Over time, a database of object location change patterns may be generated, allowing the robot to determine how object location changes are statistically correlated with other object location changes, and other location changes of the same object.

Objects may be identified by a unique identifier, or by an object class. Object location change patterns may be determined for particular objects, and also for object classes.

For example, a human activity may include acting on an object class with a particular object, for example a tool. Location change of an example of the object class to a particular location may be statistically correlated with a future location change of the tool, allowing the robot to predict that the human will need the tool in the near future. Hence the robot may assist the human by fetching the tool. Further, other location changes of the object, or other objects, may be predicted from an initial location change, allowing the robot to assist the human by performing the other location changes.

Examples of the present invention include a mobile robot with one or more actuators (such as manipulators) operable to observe an environment and to determine object data. Object data includes the current and previous locations of one or more objects in the environment. In some examples, the objects are non-human objects, for example tools, objects to be worked on, household items, and the like. The robot may be operable to determine object location change patterns, such as object location change sequences, within the stored data, and determine probabilistic distributions of future actions by comparing currently observed object locations and changes therein with the stored data. The robot may predict a future action or task goal using observed object location changes, and may provide assistance to accomplishment of a future action or task goal. One or more future actions or task goals may be identified. The robot may also determine previous and/or current activities of one or more humans within the environment, either from object data or other analysis. Stored data related to object location changes may be used to predict future human actions.

An example robot comprises one or more sensors (such as visual sensors) providing sensor data related to the environment of the robot. An electronic circuit associated with the robot may comprise a database and data storage element to record data for analysis. Analysis of data may be performed in real time, or when the robot is not otherwise engaged. The electronic circuit may comprise a processor and appropriate subsystems, and further comprise software to perform necessary processing steps. A set of actuators may be provided to allow the robot mobility within the environment, and further to affect the environment and objects therein.

In a representative embodiment, the robot may have a humanoid appearance and at least one vision sensor, a processor, a memory containing a database, and one or more actuators allowing the robot to assist the human. In other examples, the physical form of the robot may be designed to match one or more tasks with which the robot assists. Computer software may be executed by the processor, and may be operable to provide one or more features such as those described herein.

An example software program is operable to determine object data from incoming sensor data. For example the software may include image analysis software to detect discrete objects within the environment. Stored data, such as object locations and changes therein, may be stored within memory supported by an electronic circuit within the robot. Object location changes in the stored data may be correlated with task identity, and allow a set of goals to be defined. The task goals may then be correlated with an object location change pattern. In embodiments of the present invention, a location change of an object can be compared with previously stored location change patterns, so as to identify the most likely task that is being performed by the human. A robot may be operable to identify a particular pattern of goals, and a current goal reached in that pattern may be used to predict future goals. The next useful goal in the pattern may be determined from a comparison of object location changes with historical data, allowing the robot to support a human performing the task. The robot may have one or more actuators, or other mechanical means, so as to be able to execute an action to support the achievement of the determined goal by the human.

An alternative approach is for the robot to study human actions, characterize each action, and attempt to predict the next action from the characterization. However, it is computationally difficult for a robot to interpret human actions. Embodiments of the present invention allow improved predictive behavior to be obtained using a study of object locations Historical patterns (such as sequences) of object locations, object relationships, and other location changes within the environment can be used to predict the task goal. Possible advantages of the object focus approach include avoidance of modeling human location changes, for example in a human location change database. For example the action of moving an object from one location to another may be achieved in a variety of ways by a human, for example by throwing the object, walking directly from one location to the other, or wandering aimlessly around with the object before depositing it at a final location. Embodiments of the present invention allow detailed interpretation of human behavior to be in part or completely avoided through a focus on the change in location (and/or other parameter, such as operational state) of objects in the environment.

A pattern of object location changes within the stored data may comprise a group of location changes associated with a previously performed task. The patterns may be separated for each task. In other examples, stored data may include object location changes observed over a time period during which a plurality of tasks was performed.

Currently observed object location change patterns can be compared with stored data (or historical data) using existing algorithms, such as computational sequence algorithms developed in relation to genetic analysis, image analysis, text sequence analysis, and other pattern matching or data mining algorithms. A robot may only observe a few elements of a complex object location change pattern, and be able to match those few location changes to a database of object location change patterns. This may allow a complex task to be identified from only a few observations early on during the task.

Embodiments of the present invention also allow improved performance of other robotic algorithms. For example the detection of an object location change may limit the set of possible activities that may be in progress. The limited set of activities allows more computationally difficult algorithms, such as speech recognition or human motion analysis algorithms, to focus on a smaller range of possible options, thereby increasing their accuracy. For example, a tree of potential candidate choices can be pruned to allow improved matches even within a noisy environment. In this context a noisy environment may correspond to audible noise for a speech recognition algorithm, or a busy environment for a human location change analysis algorithm.

DETAILED DESCRIPTION OF THE PREFERRED EMBODIMENTS

Figure 1:
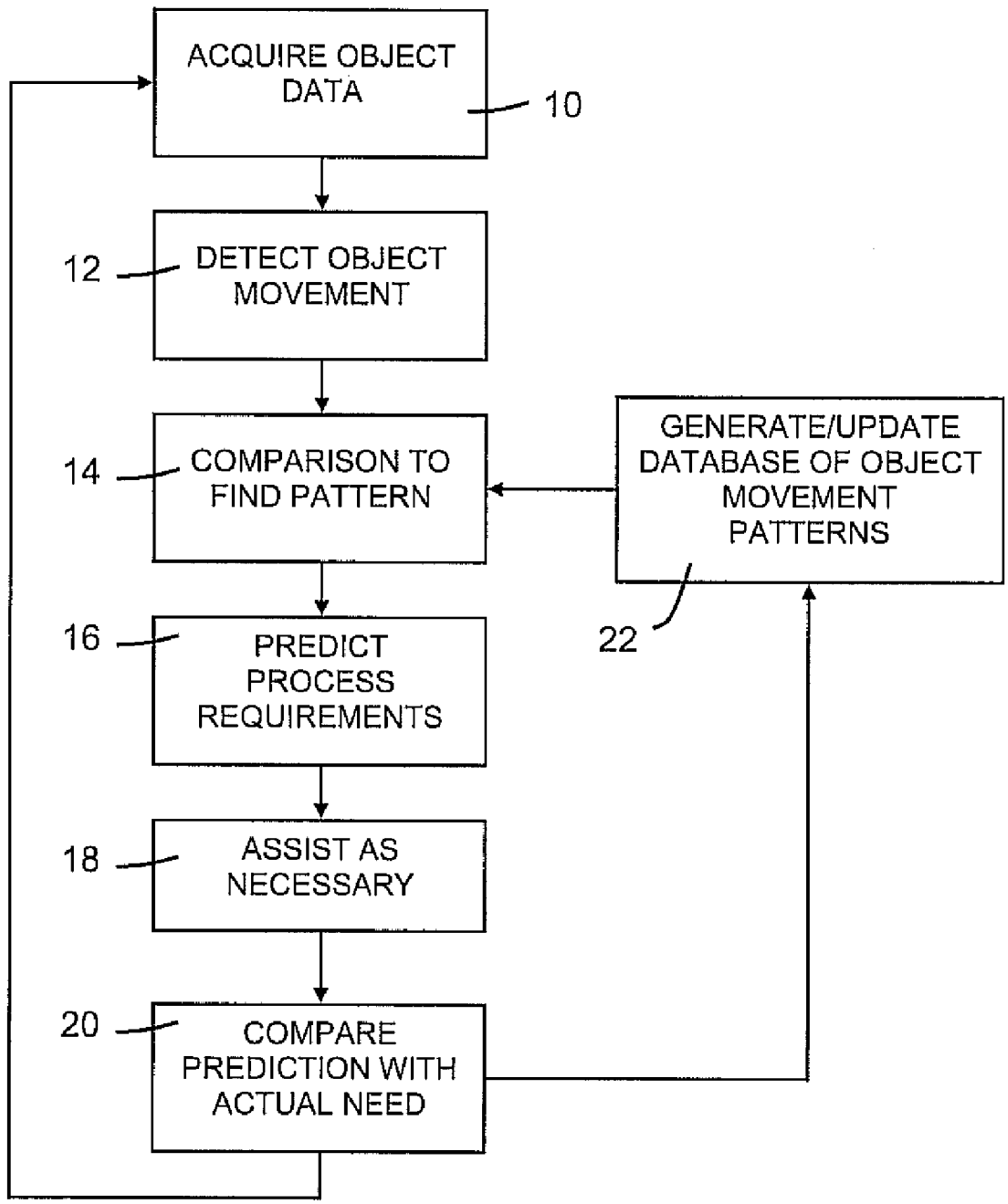
FIG. 1 is a simplified flowchart of a method according to an embodiment of the present invention.

Embodiments of the present invention relate to robotic assistance, in particular to robotic assistance of a human task. For example, a robot may determine a task goal from sensing a location change of objects within the robot environment. Object location changes may be compared with historical data comprising a collection of object location change patterns. Historical data may also be stored in the form of rules relating to particular object location changes, in which a particular pattern of object location changes can be tied to a particular task.

Task requirements can then be predicted by the robot early within the task, allowing the robot to provide assistance to the human to achieve the task goal.

Example approaches allow a robot to provide assistance with a task in various environments. For example a robot can assist a human with domestic tasks such as food preparation, cleaning, other household chores and the like. In other examples, the robot may operate in an industrial setting to assist a human worker. In further examples, a robot may assist in outdoor activities, such as agriculture, animal husbandry, hunting and the like. A robot may assist one or more humans, work with other robots to assist a human, or in some examples a robot may assist another robot in achieving a task.

An example robot includes one or more sensors, such as a light sensor. Objects are detected within the robot environment, for example by image recognition software or other data analysis software. Object location changes may be detected by identifying an object in a first location, and later identifying the object in a second location. In some examples, object location change may be detected by first detecting the object at a new location, for example if the object is known to have originated from a previously undetected location.

An object location change may include detection of the object at a plurality of locations, for example the object being removed from a first location to a second location, and then to a third location. An object location change may be related to a task requirement by comparing the detected location change with stored data. The stored data may include historical data such as object location change patterns previously correlated with task requirements. A robot may sense an environment over time to detect such object location change patterns and collect stored data for future use, for example during a training stage.

Objects may be individually identified, and/or identified by an object class. An object state may be sensed over time, continuously, or at intervals. The object state may include an object location, configuration (if appropriate), operational condition (for example on or off) or other state parameter that may be appropriate. In some examples, human actions may also be detected and categorized. The use of object location changes can be used to restrict the possible set of human actions, facilitating identification.

The task being performed by a human can be determined from an object location change. However, another possible advantage of embodiments of the present invention is that human actions do not need to be interpreted. For example it may not matter how a person moves an object from one location to the other. The mere fact of the change in object location can be used to predict how the robot may assist the person, even if the human activities have been substantially ignored by the robot.

A pattern recognition algorithm may be used to compare object location changes to sets of previously observed data. Any pattern recognition algorithm may be used, such as a nearest neighbor algorithm, or algorithms well known in other fields such as genetics. In some examples, a current object location change may be compared with all previously observed object location change patterns. However, as the volume of stored data increases, frequent patterns may be identified. Frequent patterns may also be codified as a rule. In some examples, an object location change may be first compared with known frequent patterns and, if appropriate, rules. If no match occurs a more extensive comparison may be made. In other examples, a looser match to previously observed patterns may be used if no initial match is made. FIG. 1 is a simplified flowchart of a method according to an embodiment of the present invention. Box 10 corresponds to acquisition of object data. Box 12 corresponds to detection of object location changes. Box 14 corresponds to comparing currently detected object location changes with stored object location change patterns. Box 16 corresponds to predicting process requirements using the comparison obtained in box 14, and box 18 corresponds to assisting with the task as appropriate. Box 20 is an optional step where the accuracy of the prediction determined in box 16 is compared with the actual process requirements. Box 22, which may be carried out in parallel or before the other steps, comprises generating and updating a database of object location change patterns. This database is used for the comparison mentioned in relation to box 14. Further, the database may be updated by the comparison mentioned in relation to box 20. After the task is complete and assistance is provided as necessary, the robot may continue to acquire object data for example as shown at 10.

Figure 2:
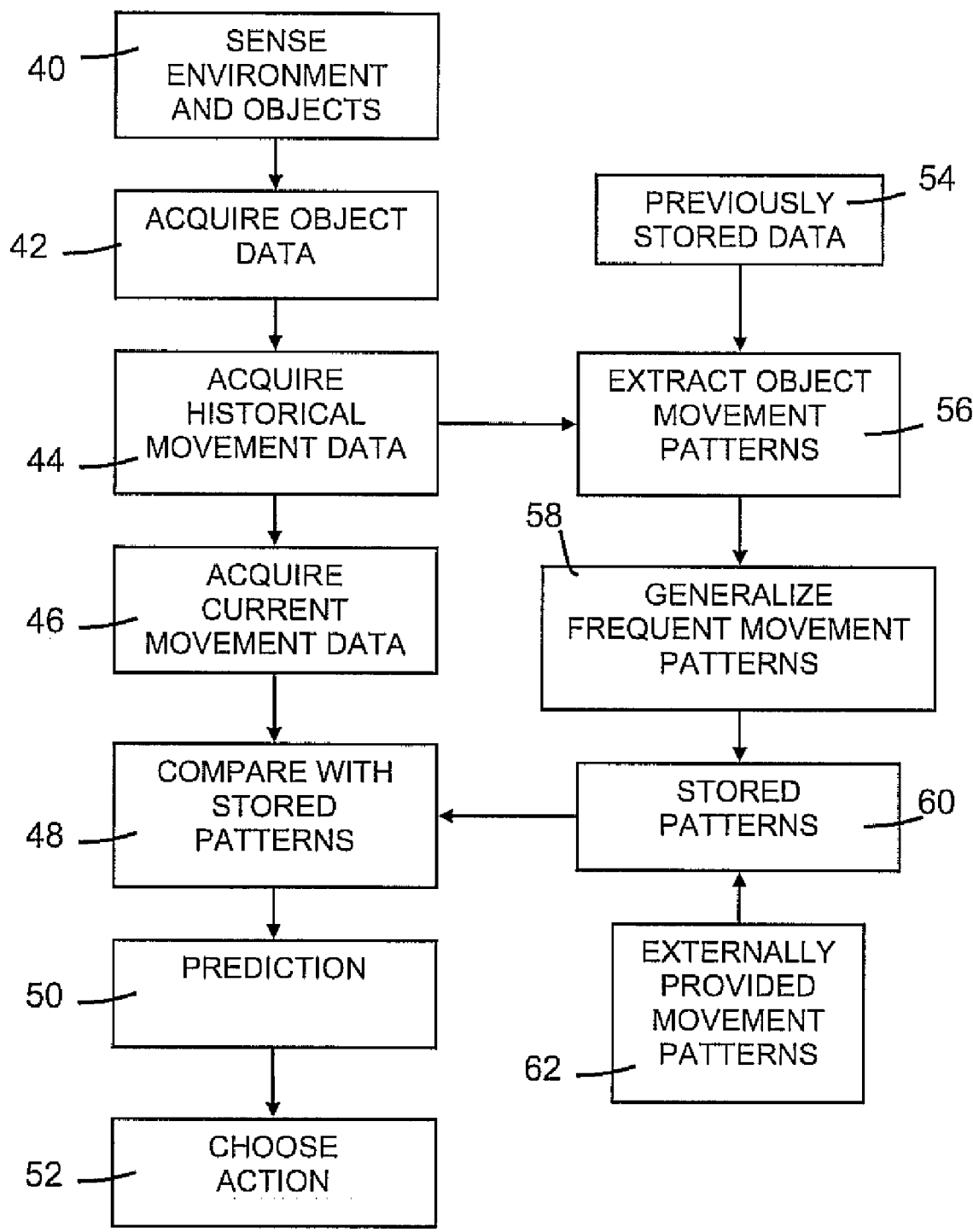
FIG. 2 further illustrates a method according to an embodiment of the present invention.

FIG. 2 is a slightly more detailed, yet still simplified flowchart. Box 40 corresponds to sensing the environment and detecting objects therein. Box 42 comprises acquisition of object data, for example object location. Box 44 comprises acquisition of historical data, for example from a preexisting database. Box 44 may correspond to a training step, and may be performed before the task described in relation to box 42 is performed. Box 46 corresponds to acquiring current object location change data. Box 48 corresponds to comparing the current location change data with the acquired historical data. Box 50 corresponds to predicting either future object location change, or other task requirements from the comparison of box 48, and box 52 corresponds to the robot selecting an action predicted to be helpful to the human.

The right-hand portion of FIG. 2 illustrates further method elements that may be performed before and/or during the process shown on the left-hand side of the figure. Box 56 corresponds to an extraction of object location change patterns from historical data collected in box 44. Box 54 corresponds to other data collection, which can be used to augment the data collected at box 54. This data may comprise earlier collected data, for example from similar robots working in the same environment, or other observations of the environment, possibly by humans. Box 58 corresponds to generalization of frequent patterns. Box 60 corresponds to storing frequent patterns in memory, for example for rapid retrieval in comparison to currently acquired data. Box 62 corresponds to provision of preprogrammed location change patterns, from any outside source, such as other robots or human observation.

Patterns and subsections thereof may be determined from stored data related to previously observed object location changes. Stored data may also include, for example, object parameters such as shape, location, translational changes, acceleration, rotational location change, rotation angle, other object parameter, changes therein, and combinations thereof.

Pattern or object recognition algorithms may be used to compare a current pattern to a set of previously observed patterns, for example using nearest neighbor or other pattern selection method. Patterns may be groups of object location changes closely associated in time, groups related to a similar task, or specific sequences of object location changes. Sequence detection and selection methods may be used to identify local dependencies in sequences. For robotic applications, these may be sequences of human behaviors and/or object location changes.

The robot sensors may be used to detect objects within the environment, and clustered object information may be converted to a form that supports detection of human behavior, relationship construction between objects, and relationship to actions for achievement of object states. Representations may facilitate explicit construction of relationships between elements (objects, actions, and states) and support generalization over objects, for example actions can be applied to a class of objects, and objects can be acted upon by a class of actions.

In various embodiments of the present invention, current object location change data is compared with past frequent patterns to predict a future object location change, which may be by the same object or other objects within the environment. The robot may be operable to recognize one or more state parameters of the object, such as location or other parameters such as location change. Socially guided learning mechanisms can be adapted to fit representations, as can other new and existing machine learning methods. Example learning methods, which may be adapted for use in examples of the present invention, are described in: A. L. Thomaz and C. Breazeal, "Asymmetric Interpretations of Positive and Negative Human Feedback for a Social Learning Agent", Proceedings of the 16th IEEE International Symposium on Robot and Human Interactive Communication (RO-MAN), 2007; and A. L. Thomaz and C, Breazeal, "Robot Learning via Socially Guided Exploration", in Proceedings of the International Conference on Developmental Learning (ICDL), 2007.

A pattern-matching algorithm may be used to compare an observed pattern (such as a sequence) of object location changes with object location sequences in a database. For example, the algorithm may be a conserved sequence detection algorithm, for example an adapted version of PrefixSpan ("PrefixSpan: Mining Sequential Patterns Efficiently by Prefix-Projected Pattern Growth", J. Pei et al., 17th International Conference on Data Engineering, 2001) or other pattern matching or data mining algorithm. Other techniques for pattern detection and pattern matching that arise from the analysis of sequential data patterns like those found in genetic sequence data may also be adapted for use with examples of the present invention.

Stored data, for example within a database, including object location change patterns may be determined by a training program. For example the robot may be exposed to an environment while a human goes about a range of activities, allowing one or more task requirements and the nature of the activity to be correlated to object location change patterns. Further, training may include object identification training, where the objects may be identified by a human or other means. A robot may use any label to describe an object, for example a unique object may be identified by a unique label. However, some objects may be identified only as within a class type, and may optionally be given a temporary identifier during a specific activity to assist tracking object location change.

For example, during food preparation, some kitchen implements may be given individual identifiers, whereas others may be identified by object class, for example plates. A temporary identifier may be given during food preparation, to track individual plates during the food preparation. Other objects may be identified as a class of consumables, for example as food items. The nature of the class can be used to predict the activity to be performed.

Figure 3:
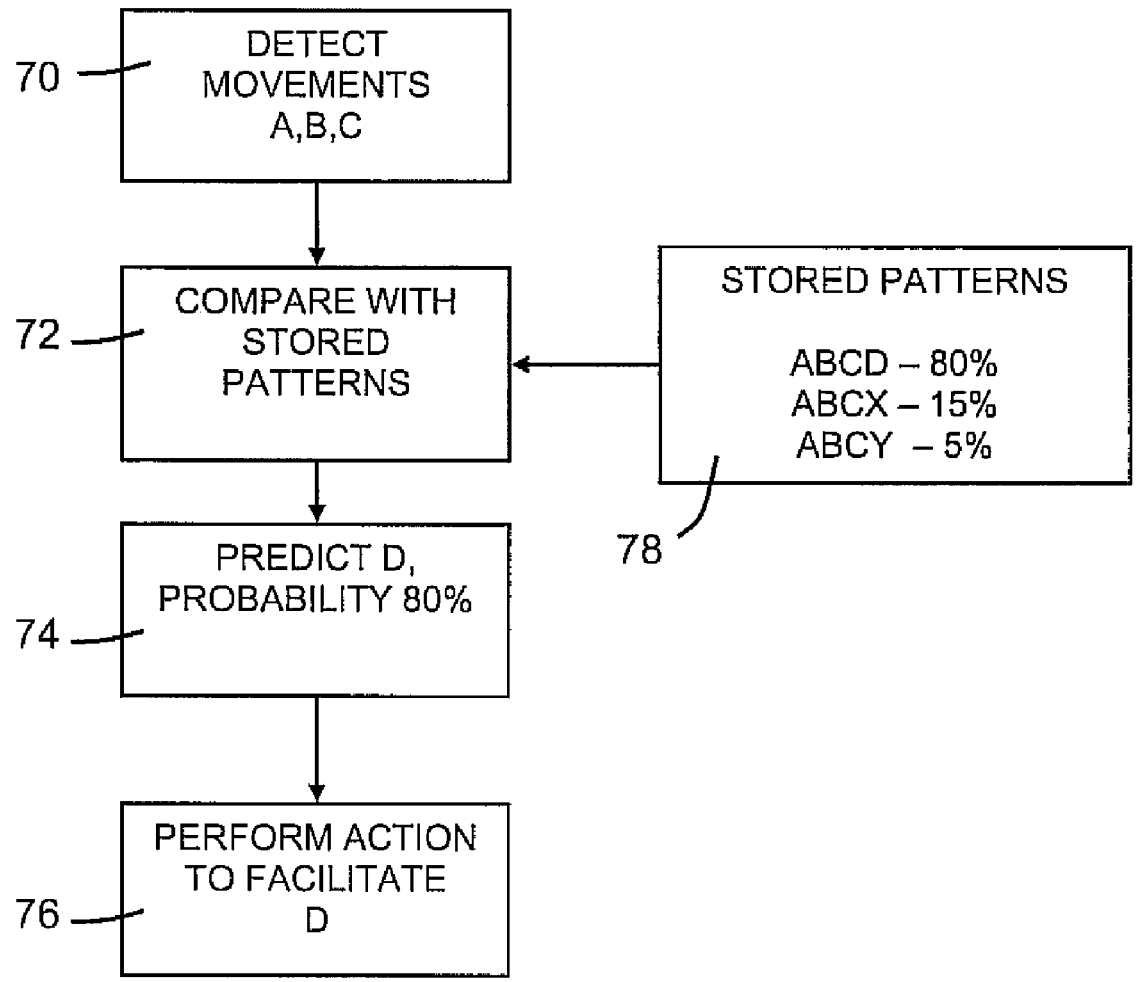
FIG. 3 is a simplified flowchart illustrating pattern matching to provide predictive benefits.

FIG. 3 is a simplified schematic showing a comparison of current location change with stored patterns. Box 70 corresponds to detecting object location changes labeled A, B and C. Box 72 corresponds to pattern matching the observed location changes ABC with stored data. In this example, box 78 corresponds to providing a database of stored data including object location change patterns ABCD, ABCX, and ABCY which occur in a distribution having different relative frequencies. The pattern ABCD has a much higher probability than the other patterns. Box 74 corresponds to task prediction (alternatively establishment of a goal belief using a statistical likelihood determined using pattern matching. In this example, the likelihood of ABCD is 80%. There may be a threshold above which reliability is inferred, such as greater than 50%, greater than 75%, or some other threshold may be used. Box 76 corresponds to the robot performing an action so as to effectuate an action (such as an object location change) that assists the human in performing the task corresponding to ABCD. In some examples, this may be performing object location change D, but this is not necessary in all cases. For example, in other examples the robot may bring an object to a convenient location to facilitate location change D by a human. Similarly, more complex location change patterns such as ABCDEF . . . may be predicted using pattern matching, the robot assisting the performance of these more complex tasks.

In some examples, the time sequence of location changes may be important, and hence an algorithm can first attempt to match observed object location changes with similarly time-ordered patterns in stored data. In other examples, a group of observed location changes may be matched against groups in stored data including the same location changes, without regard to time order. Some tasks may include sub-groups of time-ordered and non-time-ordered tasks, and an algorithm may be adapted to find a best match to such a group.

In the example above, "A" may represent a change in location of a first object from a first location to a second location. In some examples, the object may be first sensed in the second location, and assumed to have moved from a first location (e.g. an object taken out of a storage unit, such as a fridge). "B" may represent the first object being moved to a third location, or a second object changing location.

In some examples, object location changes and object operational state may be sensed by the robot. For example, "A" may correspond to a first object being relocated, and "B" may correspond to a second object (a machine) being turned on.

Figure 4:
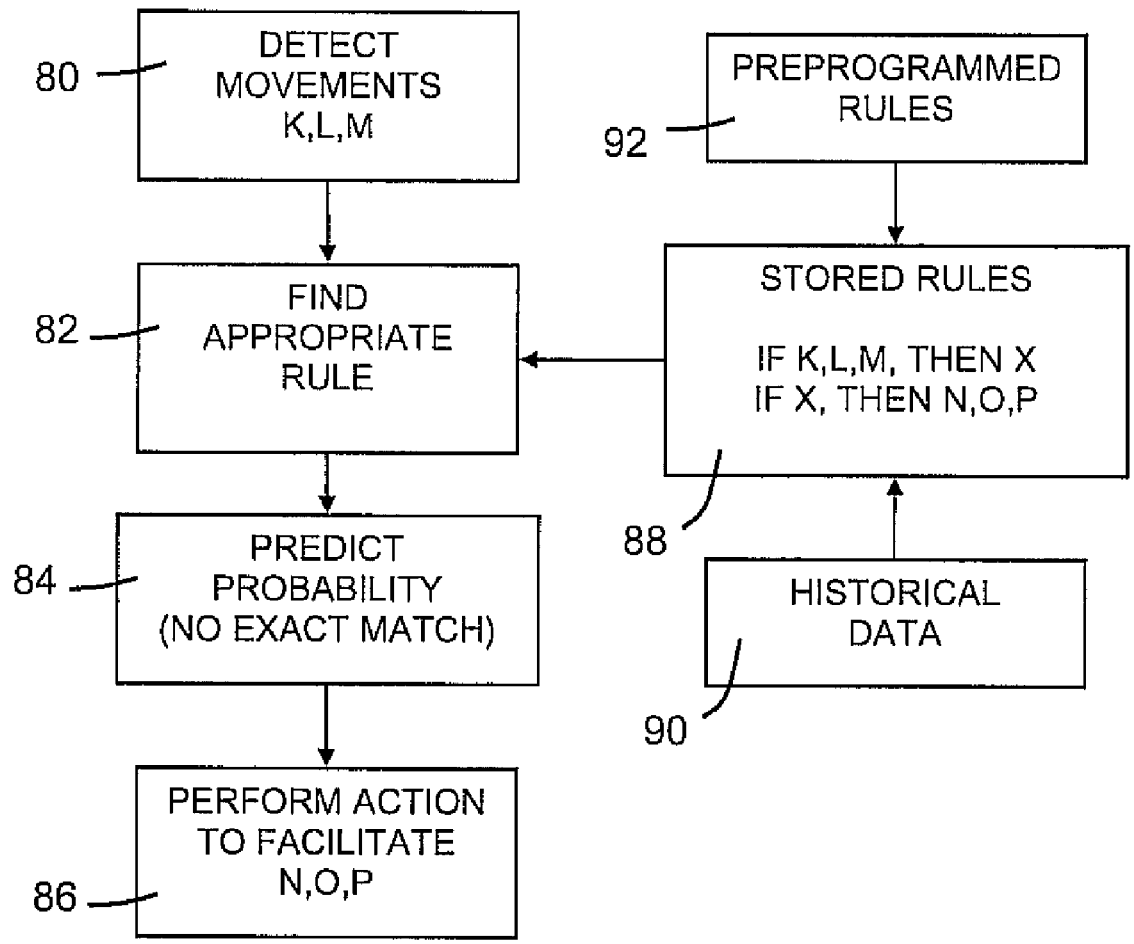
FIG. 4 is a further illustration using rules to provide predictive benefits.

FIG. 4 is a similar schematic to FIG. 3, in which pattern matching is used to find a rule from which future actions are predicted. Box 80 corresponds to detecting location changes labeled KLM. Box 82 corresponds to finding a rule by comparing the currently detected location changes with a database including one or more rules based on location change patterns. A pattern-matching algorithm may be used. In this case, a database is provided (box 88) in which KLM is indicative of task X, and task X further includes location changes N, O and P. In this case, once the one or more appropriate rules or statistical probabilities are identified at box 84, the robot may then perform actions to assist the human (box 86), in this example by performing object location changes NOP. The database accessed at 88 may comprise a mixture of statistical data rules, or some combination thereof. The rules may be preprogrammed in the database as indicated by box 92, or determined from historical data as indicated at box 90.

A combination of statistical-based pattern matching and rules may be used. For example, rules may be preprogrammed for expected common activities. For example, placing clothes in a washing machine may be associated with a rule that the robot should move the clothes to a drier at a future time, and subsequently store the clothes in a closet. A statistically likely pattern match may be converted into a rule.

Figure 5:
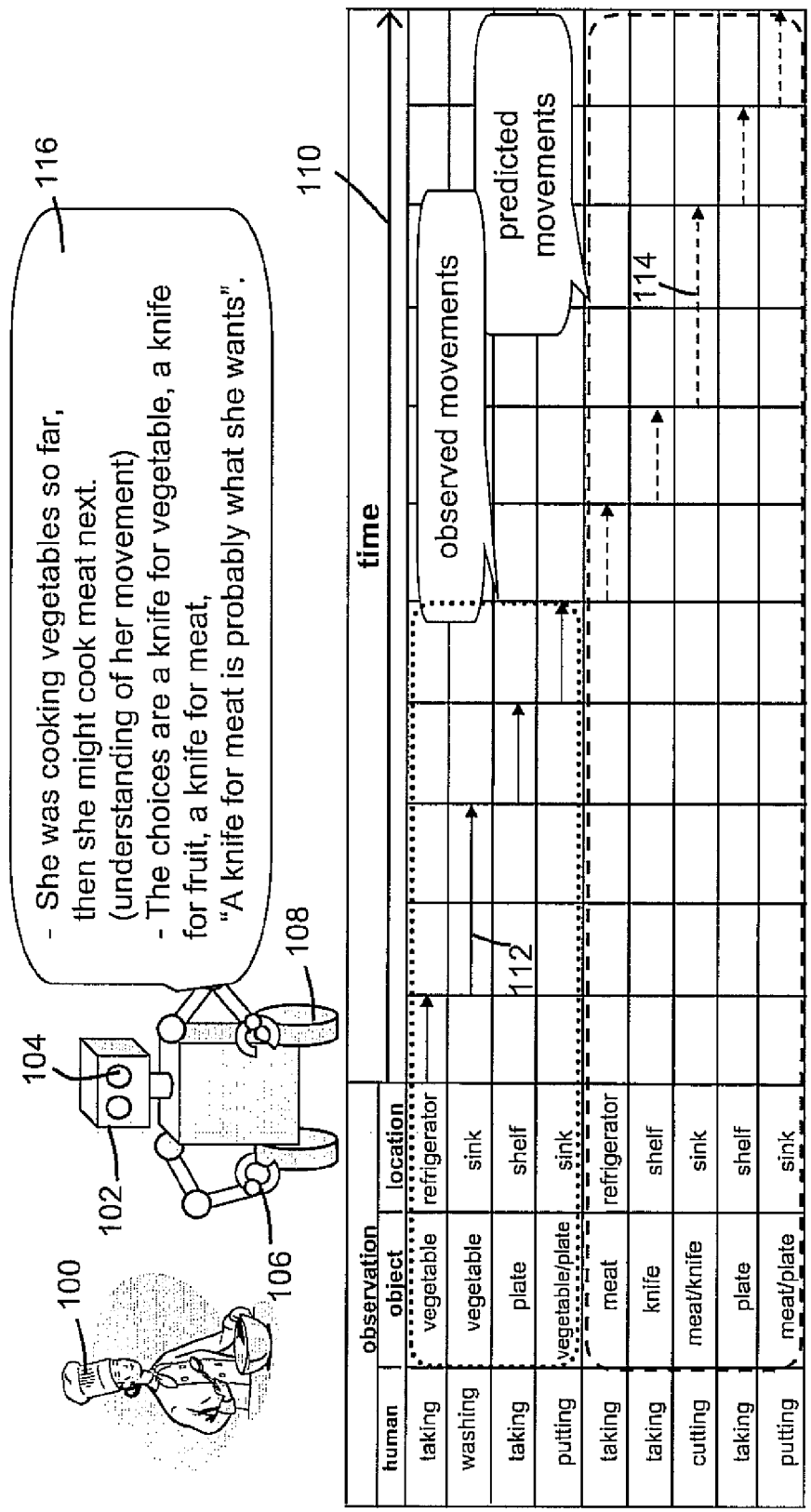
FIG. 5 is a schematic showing a robot assisting a person in a kitchen environment.

FIG. 5 is an example scenario including a human actor 100 operating in a kitchen, with a robotic assistant (robot) 102 having a pair of visual sensors 104 on an upper portion thereof, a pair of arm-like actuators 106 and a pair of wheels 108. The graphic at 110 indicates a series of object location changes illustrated by solid arrows such as 112. The graphic further includes predicted location changes indicated by dashed arrows 114. In this case the observations of object location changes indicated by arrows 112 are used to predict the next location changes as indicated at 114. The robot is able to understand the activity being performed by focusing on object location changes, and not necessarily by trying to interpret the complex physical actions of the human himself.

The left hand column of graphic 110 indicates the type of human activities related to the various object location changes. However, embodiments of the present invention avoid needing to interpret the actions or motives of a human. Future actions may be predicted from observed object location changes alone. For example, a human may absentmindedly wander around a kitchen with a plate before arriving at a particular location to perform a certain task. This behavior may be difficult computationally to understand in terms of a complex sequence of human actions, but can be reduced to be relatively simple computationally if changes in object locations are tracked simply as differences in location from starting point to ending point of the movement. Interpretation of the transitional path of an object from one location to another is not needed, as long as the start point and endpoint are identified.

The balloon 116 includes an interpretation of the function of an algorithm executed by an electronic circuit within an example robot. In this case, "probably" refers to a statistical likelihood which may be based on observations, stored data, preprogrammed rules, and the like. Observation of object locations, and changes thereof, allow an interpretation that the person is cooking vegetables. Previously, this has been followed by cooking meat. Hence, algorithm is able to predict that the human can be helped by providing a knife for cooking meat. The robot may then engage actuators (such as grippers or manipulators) and a mobility function (e.g. wheels or tracks) so as to fetch a knife for cutting meat and to place it where the human can easily use it.

Sensors, which may be located on (or be otherwise mechanically associated with) the robot, may include one or more of visual, acoustic, electrical capacitance, olfactory, or other sensors, including sensors for radio signals that may include the nature and potentially locations of the objects being described. For example, RFID tags may be used to locate and identify objects. The sensor may be an optical sensor, for example responsive to near-IR, visible, and/or UV radiation, such as a visible sensor, digital still camera, video camera, or some combination thereof. Sensors may include cameras (including UV, IR, visible, hyperspectral, laser ranging, and swept line-scanners), or other sensors that can be located on the robot and/or placed elsewhere in the environment. Sensors may be located on the robot, and the robot may also receive signals from other sensors located in the environment, such as in a room, on a countertop, or supported by a person to be assisted (for example a head-mounted sensor, eye-tracker, and the like). Other sensors may be responsive to radio waves, microwaves (including radar signals), infrared (IR), visible light, UV, signals from radiative acoustic media (including ultrasonic waves, sound waves, echoes in the normal human hearing acoustic ranges, or other vibration sensors), other forms of coupling such as capacitive or inductive, and other sensing mechanisms such as radars, lidars, phased and non-phased arrays of other sensors, swept line or point directed sensors, and any other forms from which a representation of the environment can be created that facilitates identification of objects and/or their locations in space.

In some examples of the present invention, human behavior can be interpreted by observing object locations and changes therein. This may be computationally simpler than attempting to directly interpret gestures or other human actions. If an object moves, it may not be necessary to determine how the object got from one location to another, or identify or interpret the transient path of the object. For example, an object may be identified as "in hand" if held by a person. The human behavior may then be used to predict future human behavior, and hence allow the robot to assist with the future task.

In some examples of the present invention, a robot may be operable determine to the start and end locations of objects that are moved within a sensed environment, and to use the end locations (and optionally the start locations) to predict how assistance may be provided. Full object trajectories need not be detected. If object trajectories are detected, the start and end points may be determined from the trajectory and used in predicting how assistance may be provided.

In other examples of the present invention, human behavior need not be interpreted, as useful predictions can be made from object location data, including changes in object location, without addressing underlying human motives.

Figure 6:
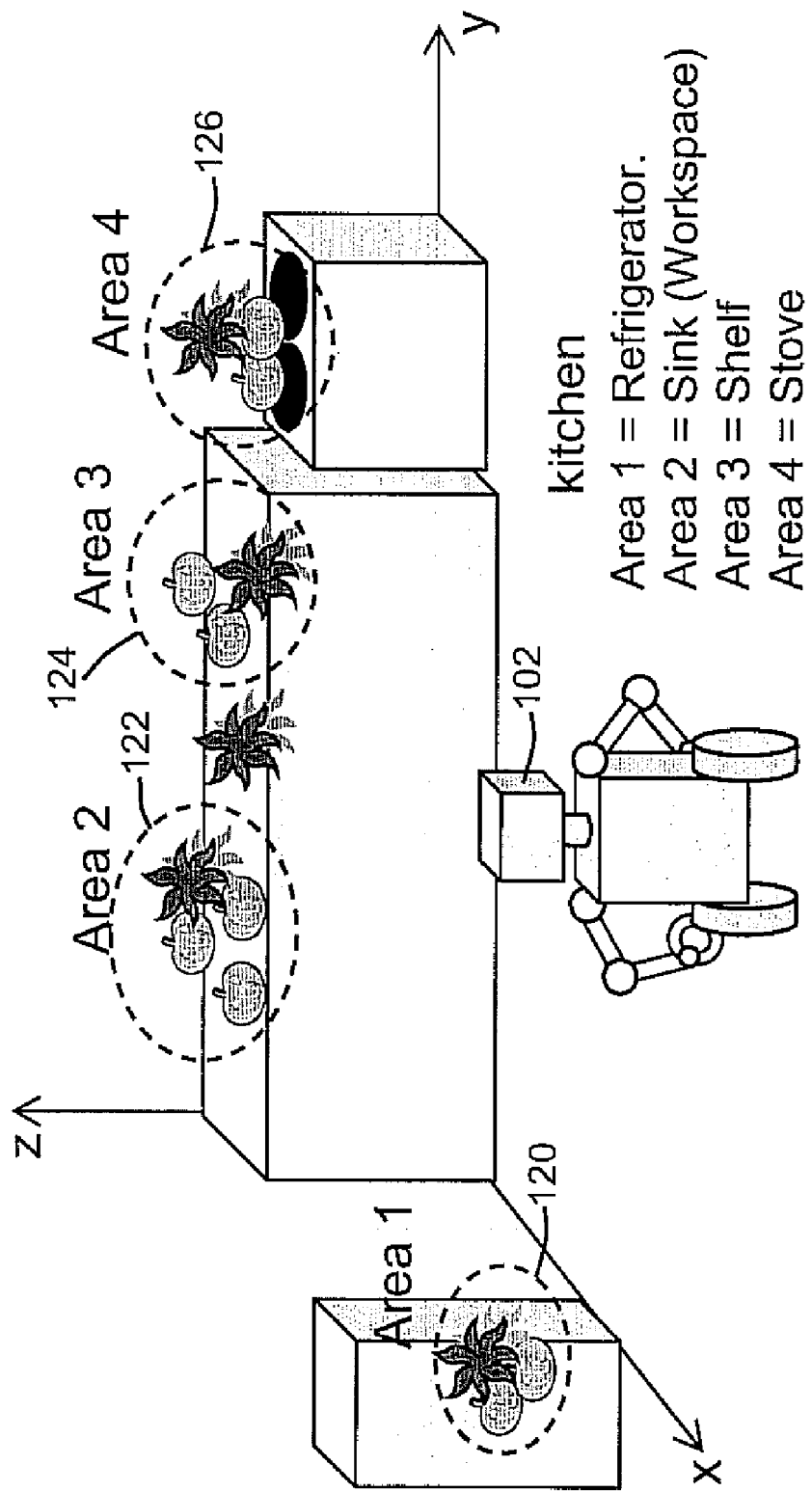
FIG. 6 is a schematic illustrating acquisition of discrete object data.

FIG. 6 shows the robot 102 located within a kitchen. The kitchen is divided into various areas labeled 120, 122, 124, and 126, corresponding to refrigerator, sink workspace, shelf, and stove respectively. The robot software may be able to discretize a continuous space into a variety of discrete locations, for example those indicated. This may be done using a training program, or by grouping frequent locations where objects are observed to stop. Hence, improved methods and apparatus are provided to support a human in an activity. Sensors on the robot may be used to observe the environment and detect objects therein. In other approaches, the robot may attempt to interpret the actions of people within the environment. However, the computational difficulty can be greatly reduced using examples of the present invention.

Figure 7:
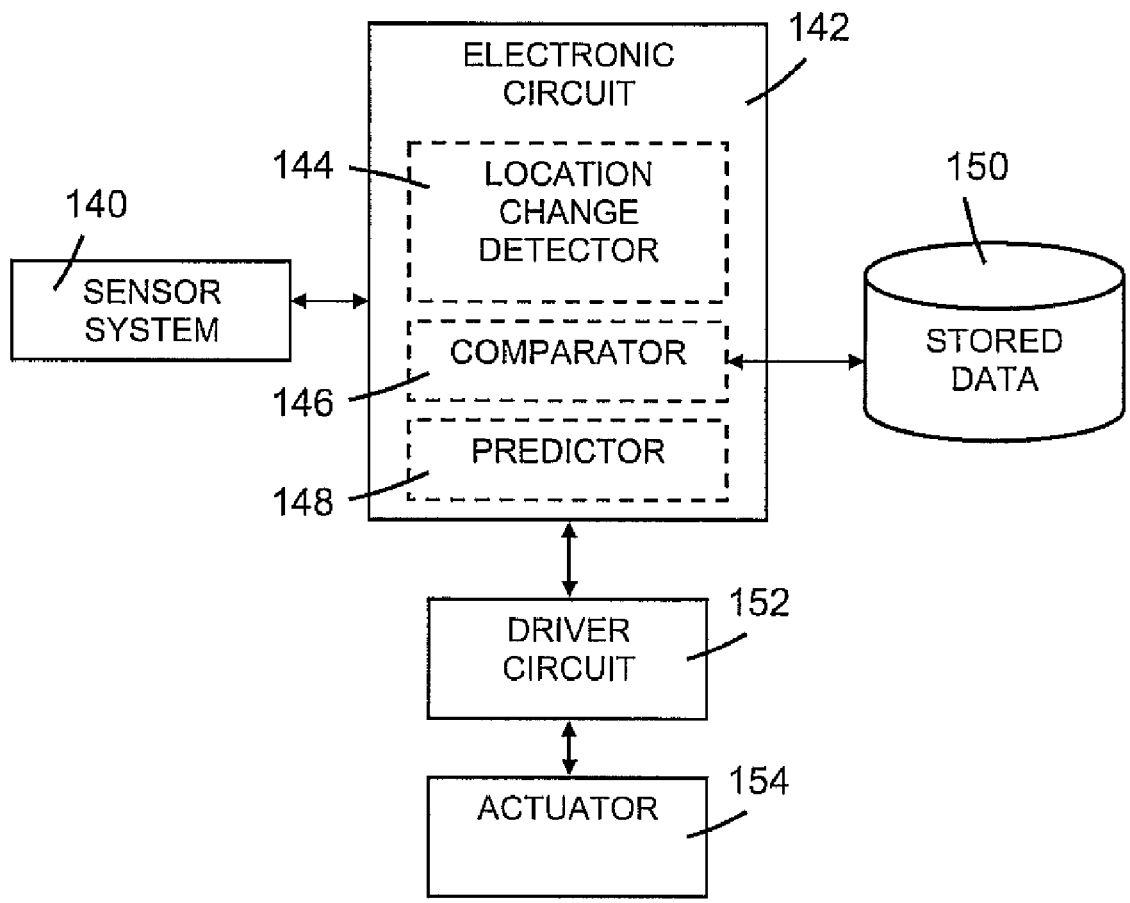
FIG. 7 is a simplified schematic of possible robot electronics.

FIG. 7 shows a simplified schematic of part of the robot electronics. The robot comprises a sensor system 140. In this example, the sensor system comprises a visual sensor and associated support electronics. The sensor system may comprise image analysis algorithms executed by a sensor system processor to provide object identification and location, or in other examples such tasks may be delegated to the electronic circuit 142. Sensor data from the sensor system 140 passes to electronic circuit 142, which comprises a processor (not shown) and associated support components such as a clock, memory, bus, and the like. The electronic circuit provides a location change detector 144, operable to detect changes in location for identified objects, and a comparator 146, operable to compare object location changes with stored data within memory 150 (indicated in this figure as stored data 150, though the memory may also be used for other purposes). A predictor 148 is used to predict a helpful next operation of the robot, using a method such as described herein. For example, the comparator may match an observed object location change to stored data, allowing a future object location change to be predicted. The function of location change detector, comparator, and predictor may, for example, be provided by separate algorithms executed by the same processor, separate circuit elements, or using any desired approach. A driver circuit 152 is used to energize the actuator 154, which is then used to assist a task in progress, for example by effecting the predicted object location change.

Methods described herein allow a simpler and more accurate approach to be used, in which robot sensors are used to monitor changing locations of physical objects within the environment, for example non-human objects. Objects may be identified by image recognition, or other mechanisms. For example, objects may be identified using physical shape, color (including patterns), labels (such as a barcode, radio transponders, and the like), or other approach or combination thereof. Object locations may be further used to restrict the possible range of activities in progress, allowing more accurate robot assistance to be provided. Observed object location changes, for example a location change from a first location to a second location, may be highly predictive of the task in progress. The accuracy or statistical likelihood of the prediction may be preprogrammed, or determined through historical observation.

Hence, changes in object parameters may be observed and used to predict task requirements. In several examples above, the tracked object parameter is object location. Object parameters may further (or alternatively) include operational mode (on/off, speed, function selected, and the like), and changes in tracked object parameters may be compared against stored data using a pattern matching or other algorithm.

Hence, an improved method of assisting a human with an activity comprises sensing an environment, detecting one or more objects within the environment, detecting a location change of an object within the environment, and comparing the object location change to previous object location change patterns. A future action can be predicted using such an approach. Pattern matching algorithms or statistical weights can be used to predict the accuracy of the prediction.

The invention is not restricted to the illustrative examples described above. Examples are not intended as limitations on the scope of the invention. Methods and apparatus described herein are exemplary and not intended as limitations on the scope of the invention. Changes therein and other uses will occur to those skilled in the art. The scope of the invention is defined by the scope of the claims.

Having described our invention, we claim:

1. A method for allowing a robot to assist with a task, the task being carried out in an environment including one or more non-human objects each having an associated object location, the method comprising:

observing object location changes of the one or more non-human objects using a sensor located on the robot;

comparing the object location changes with stored data, the stored data including patterns of object location changes associated with previously performed tasks;

predicting a task requirement using a pattern-matching algorithm to match the object location changes to the patterns of object location changes in the stored data; and providing robotic assistance to achieve the task requirement.

2. The method of claim 1, wherein detecting a change in an object location comprises:

sensing the environment using a sensor, the sensor providing sensor data; and determining object locations within the environment using the sensor data.

3. The method of claim 2, the sensor being located on the robot.

4. The method of claim 2, the sensor being an electromagnetic radiation sensor.

5. The method of claim 4, the sensor being an optical sensor.

6. The method of claim 2, the sensor being a capacitive sensor, an inductive sensor, an acoustic sensor, or an ultrasound sensor.

7. The method of claim 2, wherein the sensor is a lidar sensor or a radar sensor.

8. The method of claim 1, further comprising determining a statistical likelihood of the task requirement from a distribution of the plurality of object location changes within the stored data.

9. The method of claim 1, wherein the stored data is collected by the robot while sensing the environment during previous human activity within the environment.

10. The method of claim 1, wherein the robotic assistance is provided to a human who has started to perform the task, the robotic assistance being provided without receiving a direct request from the human.

11. The method of claim 1, wherein the task requirement is a change in location of a second object.

12. The method of claim 11, wherein the robotic assistance provides the change in location of the second object.

13. A method for allowing a robot to assist with a task, the task being carried out by a human in an environment including non-human objects each having an associated object location, the method comprising:

sensing the environment using a sensor, the sensor being a component of the robot;

determining object locations within the environment;

detecting changes in object locations within the environment;

comparing the changes in object locations with stored data, the stored data including object location changes associated with previously performed tasks;

predicting a task requirement using a pattern-matching algorithm to match detected changes in object locations with patterns of object location changes in the stored data; and providing robotic assistance to achieve the task requirement, the method being performed by the robot, the robot having an electronic circuit and an actuator operable to provide the robotic assistance.

14. The method of claim 13, wherein patterns of object location changes in the stored data are used to predict future object location changes.

15. A robot for assisting with a task within an environment including objects, the objects being non-human objects, the robot comprising:

a sensor, operable to provide sensor data representing the objects;

an electronic circuit, operable to provide:

a location change detector, operable to provide object location change data for the objects within the environment using the sensor data, a comparator, operable to compare object location change data with stored data, and a predictor, operable to predict a predicted object location change for the task from a comparison of the object location change data with the stored data; and an actuator, in electronic communication with the electronic circuit, operable to effect the predicted object location change on receipt of a signal from the electronic circuit, the predictor using a pattern-matching algorithm to match detected changes in object locations with patterns of object location changes in the stored data so as to predict the predicted object location change.

16. The apparatus of claim 15, the location change detector, comparator, and predictor being provided by one or more algorithms executable by a processor within the electronic circuit.

17. The apparatus of claim 15, the stored data being stored within a memory of the electronic circuit.

18. The apparatus of claim 15, wherein the sensor is an electromagnetic radiation sensor, a capacitive sensor, an inductive sensor, an acoustic sensor, an ultrasound sensor, a lidar sensor, or a radar sensor.

* * * * *